United States Patent
Unger et al.

(10) Patent No.: US 11,452,298 B2
(45) Date of Patent: Sep. 27, 2022

(54) GAME WASHER

(71) Applicant: Good Sportsman Marketing, LLC, Grand Prarie, TX (US)

(72) Inventors: Howard Unger, Henderson, NV (US); Thomas Rucci, Henderson, NV (US)

(73) Assignee: Good Sportsman Marketing, LLC, Irving, TX (US)

( * ) Notice: Subject to any disclaimer, the term of this patent is extended or adjusted under 35 U.S.C. 154(b) by 800 days.

(21) Appl. No.: 16/355,746

(22) Filed: Mar. 16, 2019

(65) Prior Publication Data
US 2020/0288730 A1   Sep. 17, 2020

(51) Int. Cl.
| | |
|---|---|
| *B64D 15/16* | (2006.01) |
| *A22C 17/08* | (2006.01) |
| *A22C 21/00* | (2006.01) |
| *B08B 3/10* | (2006.01) |
| *B08B 3/02* | (2006.01) |

(52) U.S. Cl.
CPC .......... *A22C 17/08* (2013.01); *A22C 21/0061* (2013.01); *B08B 3/02* (2013.01); *B08B 3/102* (2013.01); *B08B 2203/02* (2013.01)

(58) Field of Classification Search
None
See application file for complete search history.

(56) References Cited

U.S. PATENT DOCUMENTS

| | | |
|---|---|---|
| 2,760,365 A | 8/1956 | Norton |
| 3,304,063 A | 2/1967 | Ranson |
| 3,791,630 A | 2/1974 | Hinds |
| 4,173,051 A | 11/1979 | Reid |
| 4,227,550 A | 10/1980 | Bauer |
| 6,640,818 B1 | 11/2003 | Talisman |
| 7,028,697 B2 | 4/2006 | Christman |
| 7,325,557 B2 | 2/2008 | Wallace |
| 7,363,878 B2 | 4/2008 | McRobert |
| 7,748,393 B2 | 6/2010 | DiPanni |
| 9,320,286 B1 | 4/2016 | McDonald |
| 9,408,412 B2 | 8/2016 | McDonald |
| 2003/0079761 A1 | 5/2003 | Rich |
| 2004/0094190 A1 | 5/2004 | Robert |
| 2013/0093107 A1 | 4/2013 | Funderburg |
| 2014/0127986 A1 | 5/2014 | Cady |
| 2016/0144412 A1 | 5/2016 | McDonald |
| 2018/0146689 A1 | 5/2018 | McDonald |
| 2018/0236500 A1 | 8/2018 | McDonald |
| 2018/0271333 A1 | 9/2018 | McDonald |
| 2018/0289219 A1 | 10/2018 | McDonald |
| 2018/0360291 A1 | 12/2018 | McDonald |

*Primary Examiner* — Eric W Golightly
(74) *Attorney, Agent, or Firm* — Lightbulb IP, LLC

(57) ABSTRACT

An improved game washer is compatible with a variety of receptacles and includes one or more cradles for receiving and holding various types of game. Agitation for washing game is provided via one or more water flows at one or more outlets of an agitator. An outlet engages a bottom of a cradle to provide water flow at the cradle. The agitator extends out of an opening of a receptacle at a central portion thereof to receive a water supply, while forming a gap at the opening to permit a flow of water and waste material out of the receptacle.

19 Claims, 7 Drawing Sheets

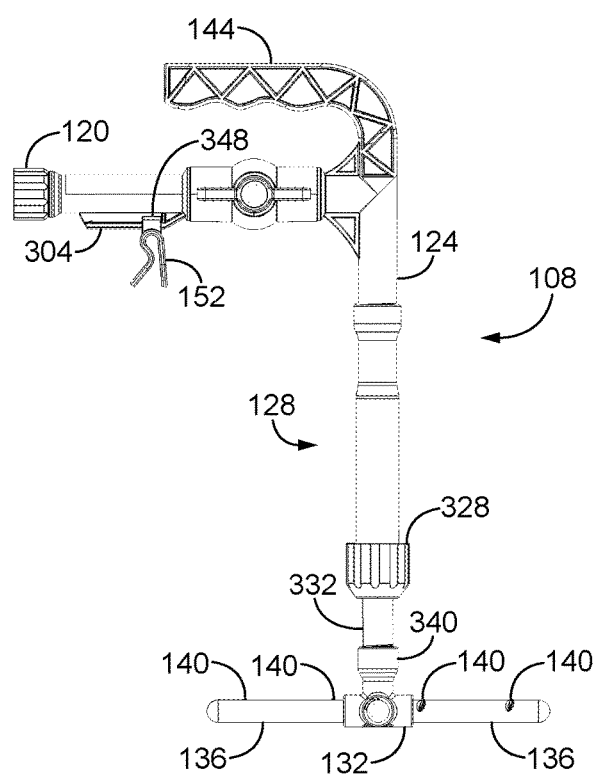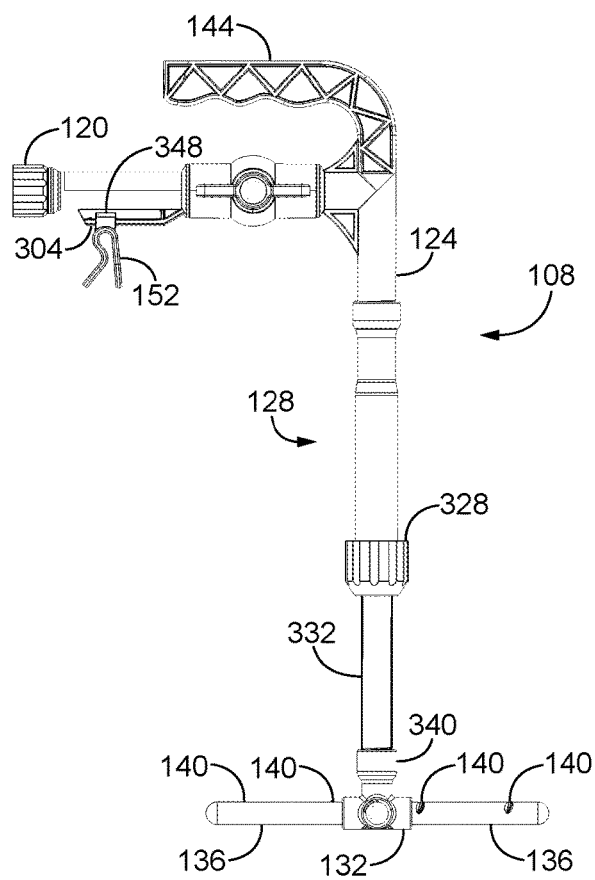

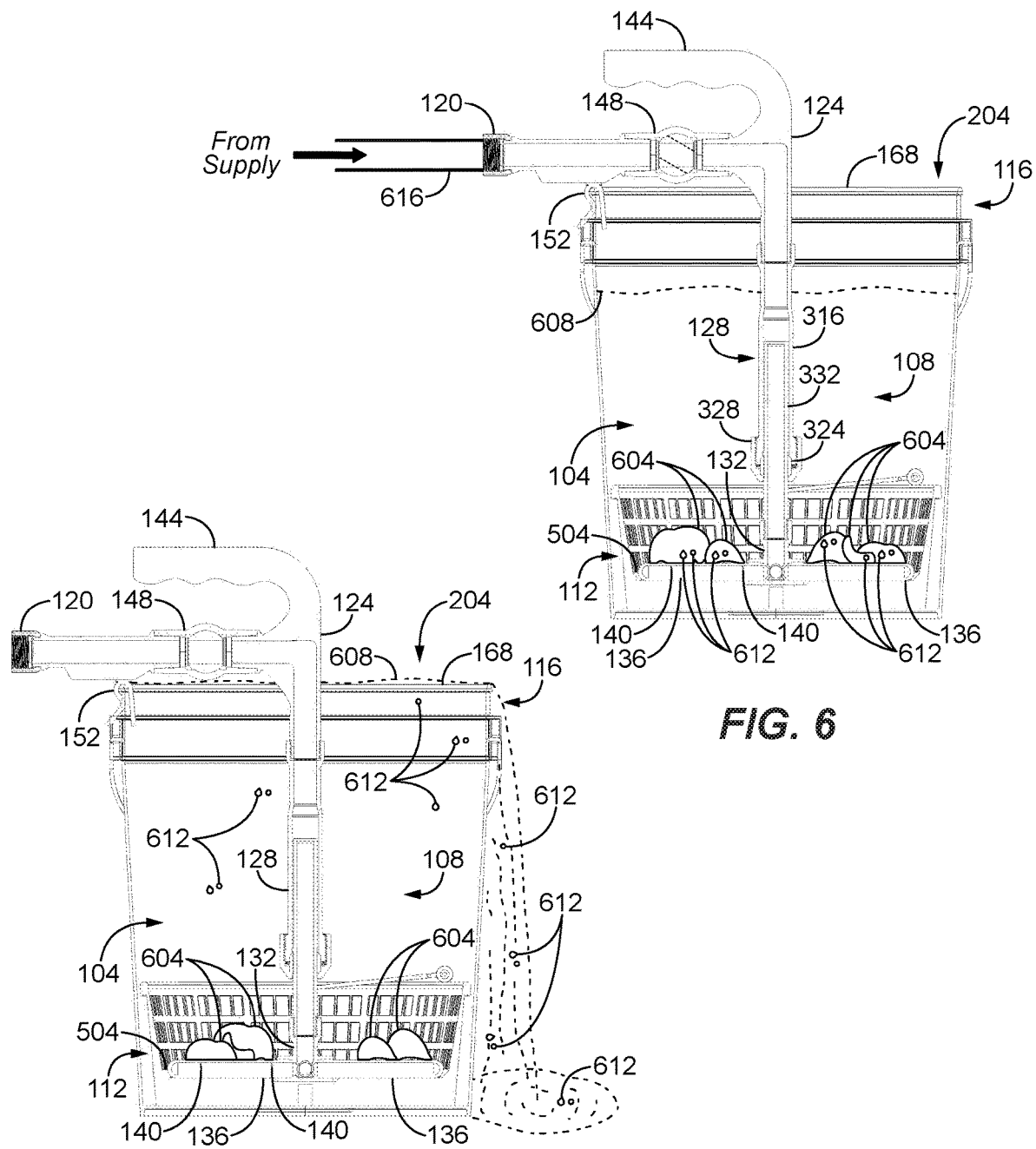
FIG. 6
FIG. 7
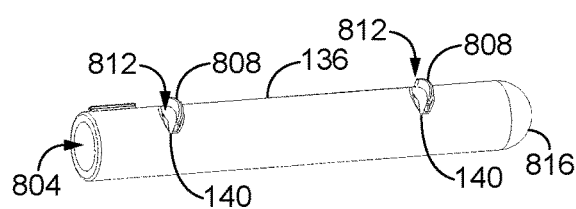
FIG. 8

GAME WASHER

BACKGROUND OF THE INVENTION

1. Field of the Invention

The invention relates to game processing and in particular to an improved game washer.

2. Related Art

Game must generally be processed to obtain suitable meat or other animal products therefrom. Cleaning or washing game is may not be a desirable task due to the requisite time and effort required. A number of methods and tools have been developed to aid hunters, and others, with this task.

From the discussion that follows, it will become apparent that the present invention addresses the deficiencies associated with the prior art while providing numerous additional advantages and benefits not contemplated or possible with prior art constructions.

SUMMARY OF THE INVENTION

An improved game washer is disclosed herein. As will be described further herein, the improved game washer is compatible with a wide variety of receptacles, game, and environments of use.

Various embodiments of an improved game washer are disclosed herein. For instance, in one exemplary embodiment, a game washer for washing game in one or more receptacles having an open top and an enclosed bottom is disclosed. In this embodiment, the game washer comprises an agitator comprising one or more conduits and one or more outlets in fluid communication therewith. The conduits extend into the open top from outside the receptacles.

A cradle that receives the agitator is included. The cradle comprises a porous body having a bottom. The outlets engage the bottom when the agitator is received by the cradle. The cradle is at the enclosed bottom when washing game in this embodiment.

The cradle may comprise one or more recesses that receive the outlets when agitator is received by the cradle. In addition, at least one of the conduits may have an extendable extension tube. Also, at least one of the conduits may be an inlet conduit that is angled such that it extends substantially horizontally outside the receptacles at the open top. One or more mounts may be at the inlet conduit to secure the agitator to a rim of the receptacles at the open top.

It is noted that the outlets may be within the cradle when the agitator is received by the cradle. A valve may be provided at the conduits to control water flow at the agitator.

In another exemplary embodiment, a game washer for washing game in one or more receptacles having an opening is disclosed. In this embodiment, the game washer comprises an agitator comprising one or more conduits and one or more outlets in fluid communication therewith. The conduits extend from the outlets and out of the opening of the receptacles and are substantially narrower than the opening to form at least one gap between the conduits and the receptacles at the opening.

A porous cradle that receives the agitator is provided as well. The porous cradle comprises a bottom, and the outlets engage the bottom when the agitator is received by the porous cradle. The porous cradle is at the enclosed bottom when washing game in this embodiment.

The porous cradle may comprise one or more recesses that receive the outlets when agitator is received by the porous cradle. At least one of the conduits may have an extendable extension tube. At least one of the conduits may be an inlet conduit that is angled such that it extends substantially horizontally outside the receptacles at the opening. One or more mounts may be at the inlet conduit to secure the agitator to a rim of the receptacles at the opening.

The outlets may be within the porous cradle when the agitator is received by the porous cradle. A valve may be provided at the conduits to control water flow at the agitator.

Various methods for washing game with an improved game washer are disclosed herein as well. For instance, in one exemplary embodiment, a method for washing game in one or more receptacles comprising an opening and an enclosed bottom is disclosed. This method comprises placing a porous cradle at the enclosed bottom of the receptacles and engaging a bottom of the porous cradle with one or more outlets of an agitator.

The agitator comprises one or more conduits and one or more outlets in fluid communication therewith, wherein the conduits extend from the outlets and out of the opening of the receptacles and are substantially narrower than the opening to form at least one gap between the conduits and the receptacles at the opening.

The method also includes placing the game upon the porous cradle and providing one or more fluid flows to the agitator. The fluid flows exit the outlets and agitate the game at the porous cradle removing waste material therefrom. The waste material is carried out of the receptacles through the gap by the waterflows.

The porous cradle may comprise one or more recesses that receive the outlets when agitator is received by the porous cradle. At least one of the conduits may have an extendable extension tube. In addition, at least one of the conduits may be an inlet conduit that is angled such that it extends substantially horizontally outside the receptacles at the opening. One or more mounts may be at the inlet conduit to secure the agitator to a rim of the receptacles at the opening. The outlets may be within the porous cradle when the outlets engage the porous cradle.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3B is a side view of an exemplary improved game washer in a retracted state;

FIG. 3C is a side view of an exemplary improved game washer in an extended state;

FIG. 6 is a side view of an exemplary improved game washer in operation;

FIG. 7 is a side view of an exemplary improved game washer in operation; and

FIG. 8 is a perspective view of an exemplary leg.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The improved game washer herein cleans or washes various game. This includes small game, such as birds and other small game, and larger game, such as deer and other larger game. As will be disclosed further below, an improved game washer will typically be compatible with a wide variety of receptacles, allowing users to improve cleanliness of game and reduce washing time and waste water, among other benefits. The improved game washer can suit particular needs of a variety of users in this manner.

Though described primarily with regard to water below, it is contemplated that various fluids or fluidic compositions may be used with an improved game washer.

Figure 1:
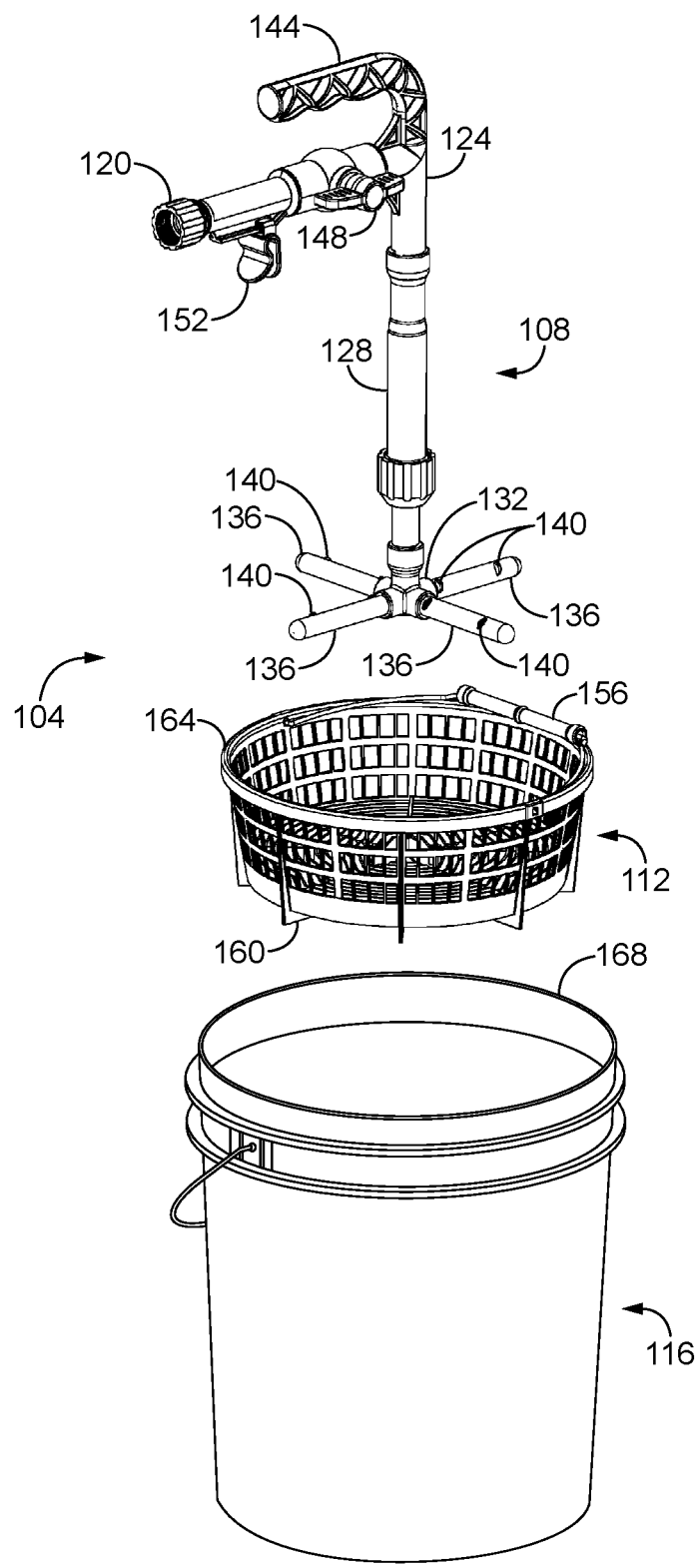
FIG. 1 is an exploded perspective view of an exemplary improved game washer and receptacle.

An exploded perspective view of an improved game washer 104 is illustrated in FIG. 1. As can be seen, an improved game washer may comprise an agitator 108 and a cradle 112. An agitator 108 may comprise one or more conduits that receive and channel water to a cradle 112, where game washing generally occurs.

More specifically, an agitator 108 may comprise one or more inlet conduits 124 in fluid communication with one or more outlets 136. An inlet conduit 124 may comprise one or more connectors 120 to connect to a water source. For example, a connector 120 may be a threaded, compression, or other connector, such as a hose or pipe connector, that connects an inlet conduit 124 to a water source. As will be described further below, an inlet conduit 124 may be angled in one or more embodiments, such that a water source may be horizontally or substantially horizontally connected.

One or more intermediate conduits 128 may be provided to connect an inlet conduit 124 to one or more outlets 136. As can be seen in the embodiment of FIG. 1, an intermediate conduit 128 extends between the outlets 136 and the inlet conduit 124. It is noted that this assembly need not always comprise separate conduits because the various conduits of an improved game washer 104 may be integrally formed in some embodiments.

One or more valves 148 may be used to control the flow rate of water through an agitator 108, at one or more outlets 136, or both. A valve 148 may also or alternatively shut off water flow to one or more outlets 136. As can be seen, a valve 148 may be located at the inlet conduit 124. Alternatively, or in addition, one or more valves may be at one or more intermediate conduits 128, outlets 136, or both.

An outlet 136 may comprise one our more ports 140 through which water flow exits an agitator 108. One or more outlets 136 may be connected via a fitting, mannifold, hub 132, or the like. A hub 132 may have a plurality of openings to permit a plurality of outlets 136 to be connected thereto. As illustrated in FIG. 1 for example, the hub 132 is a four-way connector that connects four outlets 136 extending substantially perpendicular to one another. One or more outlets 136 may also extend along the same plane, such as shown. In this manner, the outlets 136 form a base upon which the agitator can stand in a self-supporting manner. It is contemplated that a hub 136 need not be a seperate component and may be integrally formed as part of an intermediate conduit 128.

An agitator 108 may include one or more handles 144, one or more mounts 152, or both. In one or more embodiments, a handle 144 may be at a top end of an agitator 108, extend upward, or both so that a user can easily grasp the same. A mount 152 will typically be provided to removably secure an agitator 108 to a receptacle 116. This permits the agitator 108 to be secured to a receptacle 116 to aid in stabilizing the agitator while being removable therefrom, as will be described further below.

A cradle 112 will typically be a container that receives game. For example, a cradle 112 may be a tub, strainer, or basket. Typically, a cradle 112 will comprise a body 164 that is porous to allow water to flow freely therethrough. As can be seen from FIG. 1, a body 164 may comprise one or more walls and a bottom having a repeating or random pattern of openings that allow water to flow into and out of the cradle 112.

A cradle 112 may also comprise one or more supports 160 that elevate the cradle. A support 160 may be shaped and positioned such that it does not obstruct water flow at a bottom end of a cradle 112. In this manner, water can flow through a cradle 112 at the bottom of the cradle as well as at the sides or walls of the cradle. This improves agitation of the game.

One or more handles 156 may be attached to a cradle 112 to allow a user to easily grasp and manipulate the cradle. As can be seen, the cradle 112 illustrated in FIG. 1 comprises a pivoting handle 156. A user may pick up and move the cradle 112, and any game therein, via the handle 156. This allows a user to easily place game into a cradle 112, remove game from a cradle, or both. In addition, a handle 156, when pivotable, may be stowed, such as shown in FIG. 1, such that it does not obstruct water flow during game washing.

It is noted that an agitator 108 and cradle 112 will typically be removable from one another, such as shown, but may be provided as a single integrated component in some embodiments.

Figure 2:
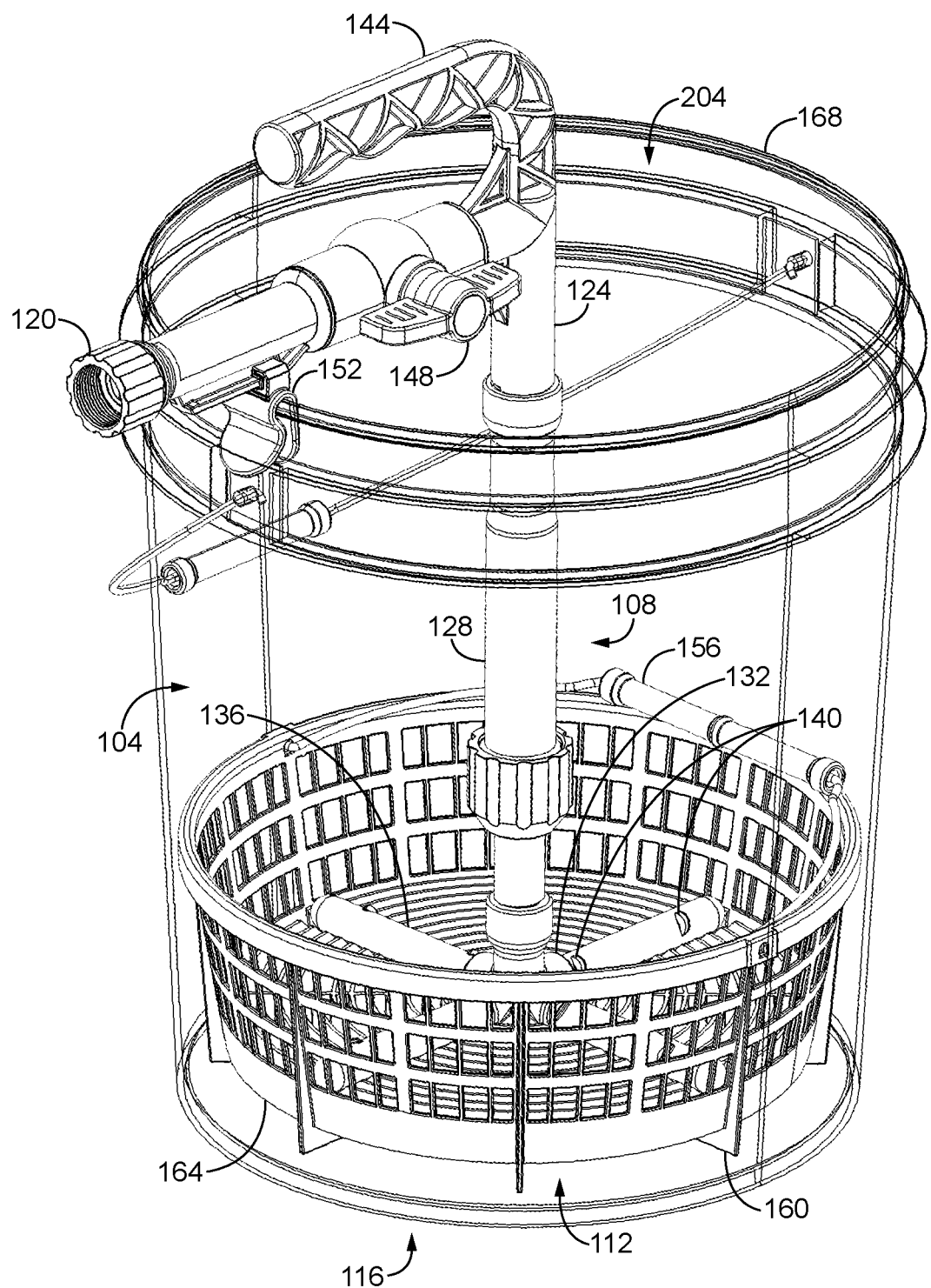
FIG. 2 is a perspective view of an exemplary improved game washer and receptacle.

FIG. 2 illustrates a perspective view of an assembled improved game washer 104 in a receptacle 116. The receptacle 116 has been shown in transparent form so that the improved game washer 104 can be more readily seen. As can be seen, when assembled for operation, an agitator 108 will typically engage a cradle 112 at its outlets 136 or bottom end. In addition, an agitator 108 and cradle 112 may received in a receptacle 116 via an open top, open end, or other opening 204 of the receptacle suitable to accommodate the same.

It is noted that an improved game washer 104 may assembled before or after it is placed in a receptacle 116. For example, an agitator 108 and cradle 112 of an improved game washer 104 may be engaged and then placed in a receptacle 116 thereafter. Alternatively, a cradle 112 may be placed in a receptacle 116 and then engaged by an agitator 108. Because these components can be separated, they can be individually manipulated, cleaned, and maintained.

As can be seen, an agitator 108 may extend from one or more outlets 136 at its bottom end and out of an opening of the receptacle 116. In the embodiment of FIG. 2, the agitator 108 extends at a substantially horizontal orientation above the receptacle 116 and at a substantially vertical orientation within the receptacle at a central area of the receptacle. The angle of the inlet conduit 124 allows the agitator 108 to extend in such manner.

An agitator 108 will typically be sized such that it does not obstruct water flow out of the receptacle 116. As can be seen in FIG. 2, the agitator's intermediate conduit 124 is narrow relative to the opening 204 through which it is received by a receptacle 116. In this manner, a gap is formed between the agitator 108 and the rim 168 of the receptacle. This allows water to readily flow out of the opening 204 of the receptacle 116 to carry away waste material during washing, as will be described further below. As can be seen, a gap may be several times larger than the diameter or periphery of an intermediate conduit 124. This ensures a free flow of water out of a receptacle's opening 204 during washing.

As described above, a mount 152 may secure the agitator 108 to a receptacle 116. As can be seen from FIG. 2, a mount 152 may secure an agitator such that it is maintained at the center of the receptacle 116. For instance, as shown, the portion of the inlet conduit 124 and the intermediate conduit 128 that extend into the receptacle 116 do so at a central area of the receptacle.

A mount 152 may be at a horizontally extending or other outwardly extending projection of an agitator 108 to secure the agitator to a receptacle 116. In the embodiment of FIG. 2, for example, the inlet conduit 124 is angled so as to form a horizontally extending portion that projects outward, and the mount 152 is attached thereto. In this case, the mount 152 secures the agitator 108 to a rim 168 of the receptacle 116.

A mount 152 may comprise one or more clips or clamping mechanisms, such as shown. Alternatively, or in addition, a mount may comprise various fasteners, such as screws, pins, magnets, ties, hook and loop fasteners, and the like. A mount 152 may also be movable to accommodate various receptacles 116 in some embodiments, as will be described further below.

Figure 3A:
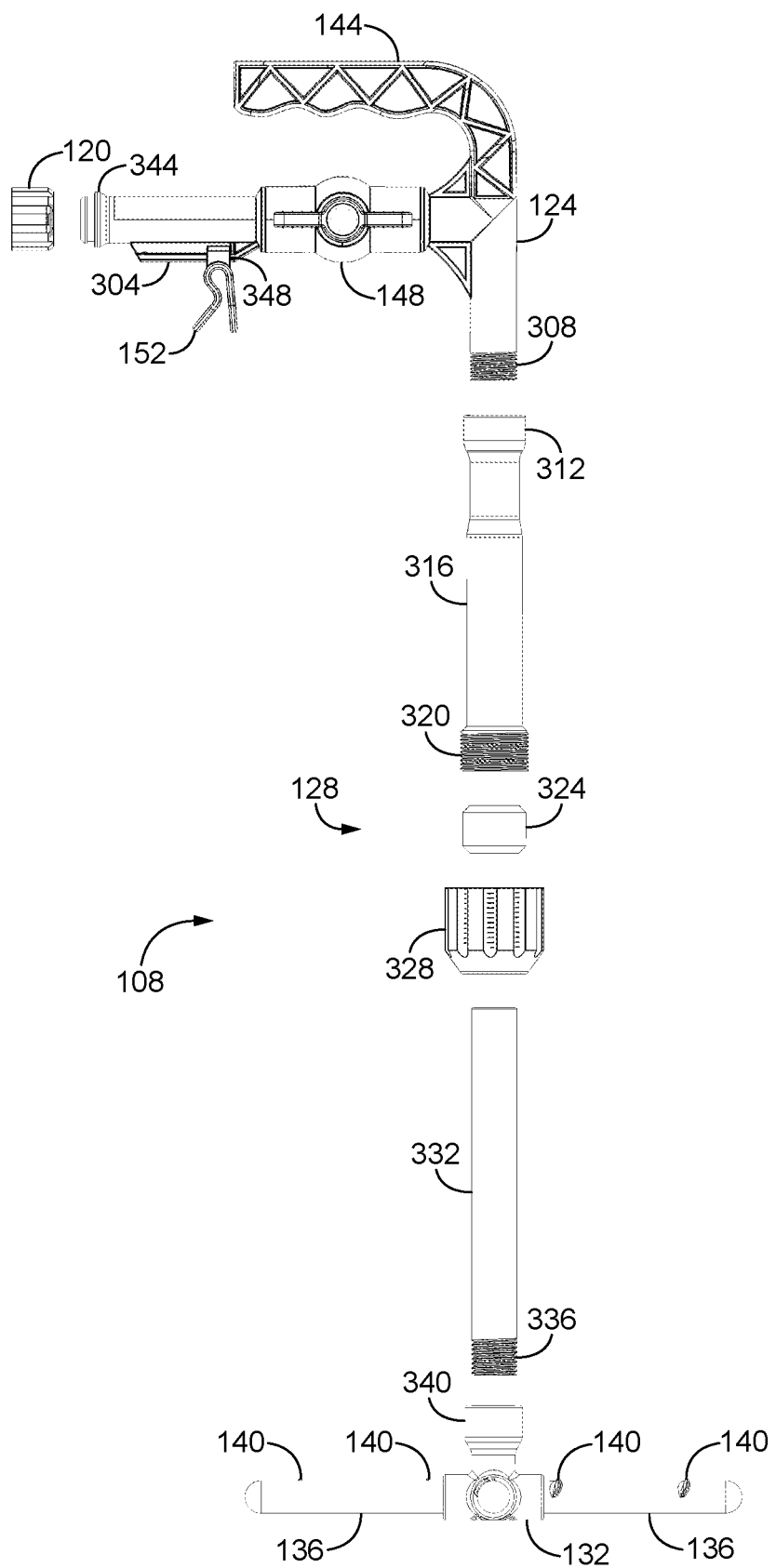
FIG. 3A is an exploded side view of an exemplary improved game washer.

FIG. 3A illustrates a side exploded view of an agitator 108. Components of an agitator 108 that allow the agitator to be used with a variety of receptacles 116 can be more readily seen in this view. As will now be described, an intermediate conduit 128 may extend and retract to allow the one or more outlets 136 of an agitator 108 to be located at various positions. This allows an agitator 108 to extend into short and tall receptacles and engage a cradle placed therein.

An intermediate conduit 128 may comprise an extension tube 332 that extends and retracts relative to a fitting 316. As shown, the extension tube 332 is received within a correspondingly sized fitting 316 and extends and retracts relative to the same. When a desired length is achieved, a collar 328 may be attached to the fitting 316 to secure the extension tube 332 in position. For example, a collar 328 may be rotated and tightened onto a thread 320 of a fitting 316 to secure an extension tube 332.

A gasket 324 may be provided to ensure a water tight seal. In one or more embodiments, a gasket 324 may receive an extension tube 332 therein and be compressed between the thread 320 (or other portion of the fitting 316) and the collar 328, such that a seal is formed when the collar 328 is tightened. This helps to ensure that water pressure and flow is not reduced by leaks at an intermediate conduit 128.

The side views of FIGS. 3B and 3C illustrate an agitator 108 in a retracted state and an extended state, respectively speaking. As can be seen, an agitator 108 may be retracted or extended to engage a cradle at various at its one or more outlets 136 in receptacles of varying heights. This also positions the mount 152 at an elevation where it can attach to a rim or other portion of a receptacle.

As noted above, an agitator's mount 152 may also accommodate various receptacles. In one or more embodiments, a mount 152 may be slidable or otherwise movable to permit attachment to a variety of receptacles. As shown in FIGS. 3A-3C for example, the mount 152 is attached to a rail 304 or track at a horizontally extending portion of an agitator 108, such as an inlet conduit 124, via a slide 348. This allows the mount 152 to slide or move horizontally to various positions to attach to receptacles of various diameters. To illustrate, in FIGS. 3B and 3C, the mount 152 has been moved towards and away from the intermediate conduit 128, respectively speaking.

Figure 4:
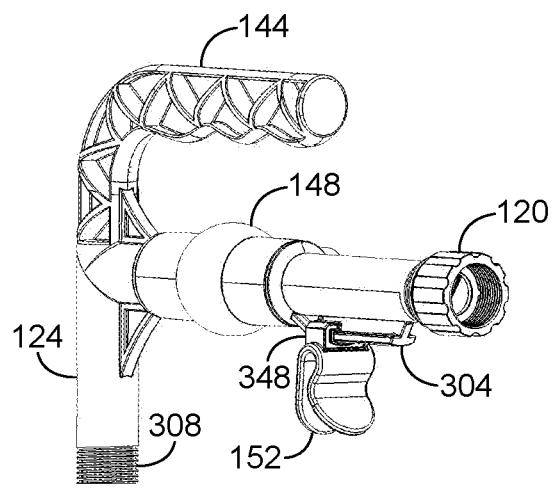
FIG. 4 is a perspective view of an exemplary inlet assembly.

As can be seen in the perspective view of FIG. 4, the slide 348 engages the rail 304, allowing the mount 152 to move to various positions along the rail. In one or more embodiments, a friction fit or one or more clamping or fastening mechanisms at a slide 348 or mount 152 may be used to hold the mount in a set position.

Mobility of a mount 152 may be accomplished in other ways as well. For example, a plurality of mounting points, such as unthreaded or threaded holes, may be formed at an inlet conduit 124 or projection or other structure thereof. A mount 152 may then be moved to and attached at the various locations of the mounting points. Typically, mounting points will be formed at different horizontal distances so as to allow a mount 152 to attach to receptacles of various diameters.

Referring back to FIG. 2, it can be seen that the agitator's inlet conduit 124 and mount 152 have been located at a horizontal and vertical position that accommodates the particular receptacle 116 illustrated in FIG. 2. It can also be seen that the intermediate conduit 124 could be respectively extended or retracted for taller or shorter receptacles 116, as described above. In addition, the mount 152 can be respectively moved inward or outward to attach to a rim 168 of a narrower or wider receptacle 116.

The same is advantageous in that it permits use of a particularly sized receptacle 116 for a particular use. For example, a user may desire higher agitation and achieve the same by utilizing a narrower, shorter, or otherwise smaller receptacle 116. Another user may desire lower agitation, such as to avoid damaging the game, and utilize a wider, taller, or otherwise larger receptacle 116. In addition, a user may select different receptacles 116 based on other criteria, such as portability, packability, and transportability. Because the agitator 108 is compatible with a variety of receptacles 116, the user has a range of options and may make a selection based on their individual needs or preferences.

Referring back to FIG. 3A, it can be seen that an intermediate conduit 128 may be removable in some embodiments. In one or more embodiments, an intermediate conduit 128 may be removable from an inlet conduit 124, a hub 132, one or more outlets 136, or various subsets thereof. It is contemplated that such removability may be accomplished via one or more threaded, compression, or other removable connections. In the embodiment of FIG. 3A, a thread 308, 336 and corresponding threaded connector 312, 340 are provided to allow the intermediate conduit 128 to be removed and replaced.

Such removal and replacement capability may be utilized for repair and maintenance purposes, such as to remove stoppages or repair leaks. In addition, it is contemplated that one intermediate conduit 128 having a fixed length or an insufficient range of lengths may be replaced with another intermediate conduit having the desired range.

Though shown as having four outlets 136, it is contemplated that an agitator 108 may comprise fewer or additional outlets in the various embodiments thereof. In the exemplary embodiments of FIGS. 3D-3F for instance, an agitator 108 may comprise a single outlet 136 having one or more ports 140. It is contemplated that one or more ports 140 may provide water flow in a single direction as it leaves the outlet 136. For example, an outlet 136 may have a port 140 that provides a fan or other unidirectional spray pattern, such as shown in FIG. 3D.

Figure 3D:
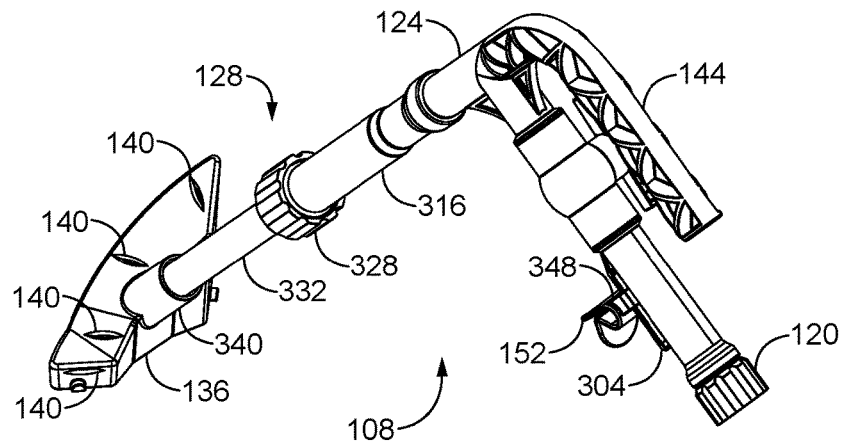
FIG. 3D is perspective view of an exemplary improved game washer.
Figure 3E:
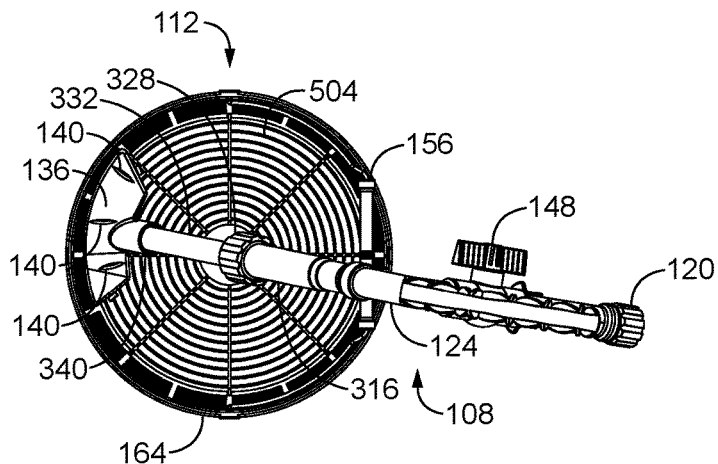
FIG. 3E is top view of an exemplary improved game washer.
Figure 3F:
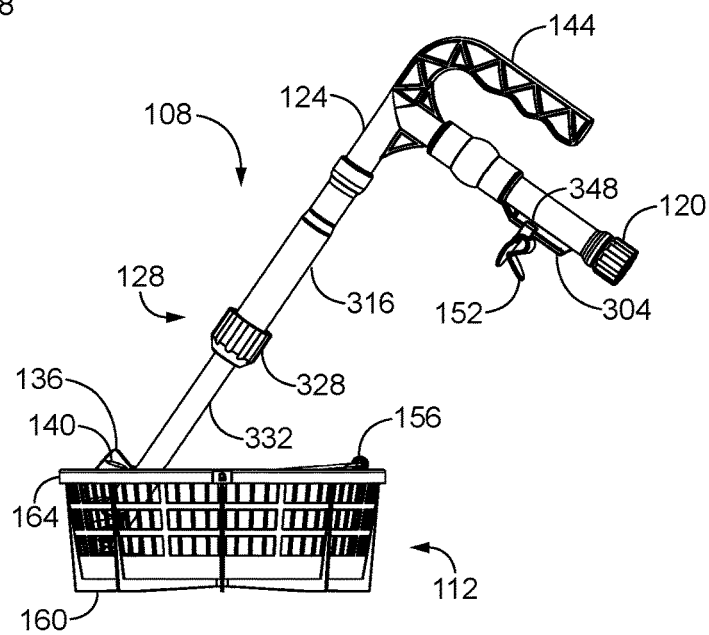
FIG. 3F is side view of an exemplary improved game washer.

It is noted that the outlet 136 of FIGS. 3D-3F has a wedge shape, which allows one or more ports 140 thereof to be positioned at distinct elevations and positions to provide particular water flows. As can be seen, the outlet 136 may be shaped or sized such that it extends from the bottom 504 to the top of a cradle 112. This allows water flows to be generated at various elevations between the top and bottom of a cradle's body 164 within the cradle 112. It is contemplated that ports 140 of an outlet 136 may have distinct flow rates, such as to provide stronger or weaker water flows at various elevations (or other positions) or in various directions.

Figure 5:
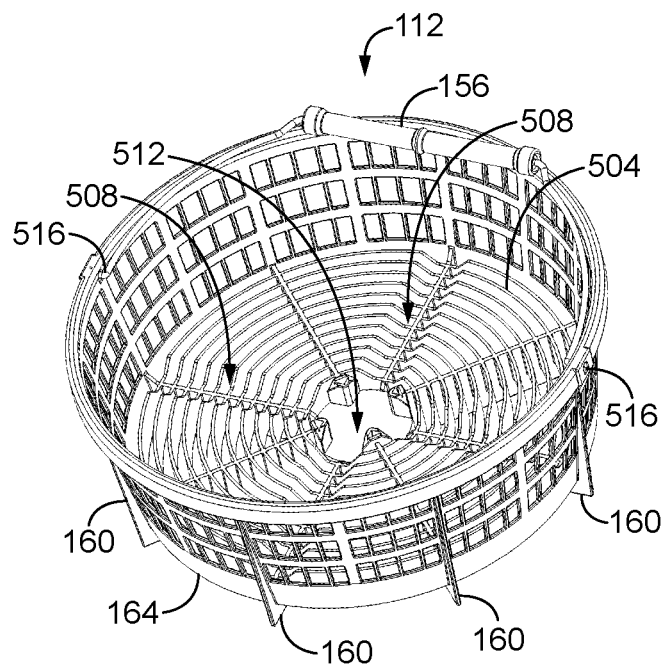
FIG. 5 is a perspective view of an exemplary cradle.

FIG. 5 illustrates a perspective view of a cradle 112. A bottom 504 of a cradle 112 can be more readily seen in this view. As can be seen, a cradle 112 may have elements formed to engage an agitator, to provide a stable foundation for an agitator, or both. For instance, a cradle 112 may have a bottom 504 with one or more recesses or openings 512 to receive a hub or other portion of an agitator. Alternatively, or in addition, a bottom 504 may have one or more recesses 508 or openings to receive one or more outlets of an agitator. Such recesses 508 or openings 512 may be formed such that they correspond to the shape of a hub, outlet, or other portion of an agitator to help hold these components in place when an agitator and cradle 112 are engaged.

A recess 508, opening 512, or both may be formed to locate an outlet received therein at a level or substantially level position relative to the bottom 504. In this manner, the outlets of an agitator do not obstruct movement or washing of game as the game is agitated in a cradle 112.

When washing is complete, a cradle 112 and game therein may be easily removed by lifting the cradle 112 via a handle 156. As disclosed above, a handle 156 may be extended for grasping and stowed during washing. This may be achieved by mounting a handle 156 with one or more pivoting mounts 516, such that the handle may be stowed to avoid obstructing agitation of the game during washing.

Operation of an improved game washer 104 will now be described with regard to FIGS. 6 and 7. Though disclosed in particular sequences, it is noted that the various steps disclosed below may occur in different sequences.

Referring to FIG. 6, whole or portions of game 604 may be placed within a cradle 112 for washing, the combination of which may be placed within a receptacle 116. Typically, a cradle 112 will be placed at a bottom of a receptacle 116, such as shown. As can be seen, at least the bottom of the receptacle 116 may be fully enclosed to store water at a bottom end of the receptacle.

It is noted that a sufficiently sized receptacle 116 may be selected based on the size or other characteristics of the game. In addition, game 604 may be initially processed, if desired, to proportion the game such that it can be received within a cradle 112.

The game 604 will typically be elevated by a bottom 504 of a cradle 112, such as to allow agitation to occur from below. As described above, an agitator 108 may be placed such that it extends into the receptacle 116 and its outlets 136 engage a bottom 504 of the cradle 112. As can be seen, an intermediate conduit 128 of the agitator 108 extends at a central area of the receptacle 116 and may be secured at this position via a mount 152 that attaches to a rim 168 or other portion of the receptacle.

Water 608 from a water supply or source may be introduced into the agitator 108 at a connector 120. As can be seen, the connector may be releasable, such as a rotatable threaded hose or pipe connector, that is in fluid communication with the agitator's inlet conduit 124. In operation, water 608 flows through the inlet conduit 124, through an intermediate conduit 128, and exits at one or more outlets 136. Typically, water 608 will exit an outlet 136 at one or more ports 140 thereof.

Typically, inlet conduits 124 and intermediate conduits 128 will be sealed so as to provide a sealed channel or path for water flows until they reach a port 140 of an outlet 136. This maintains water flow within the agitator so as to avoid leaks or other potential losses to flow rate or water pressure.

A valve 148 may be initially closed, such as to allow proper placement of an improved game washer 104 and components thereof, and the game 604 to be washed. A valve 148 may be opened to allow water 608 to flow through the agitator 108 and into the receptacle 116. Initially, the water 608 will primarily be used to fill the receptacle 116. FIG. 6 illustrates a water line showing the water 608 as it fills the receptacle 116.

It is contemplated that a valve 148 may have various states or modes in some embodiments. For example, a valve 148 may have a fill mode and an agitation mode providing different flow rates. These modes may be selected by opening the valve 148 to one or more predefined positions, detents, states, or the like. In one embodiment, a fill mode has a lower flow rate than an agitation mode, such as to prevent water from spraying or splashing excessively out of the receptacle 116. As can be seen by the broken lines at the valve 148, rotation of a valve may partially restrict water flow to achieve a fill mode.

The game 604 is agitated by the water 608 exiting the outlets 136. This includes surface agitation as the water 608 impacts the surface of the game 604 as well as agitation caused by one or more water flows moving or pushing the game within the cradle 112. The agitation loosens and removes contaminants, unwanted remnants of the game, and other waste material 612 from the game 604 thereby washing the game 604. For example, agitation can remove dirt, rocks, dust, projectiles, feathers, fur, skin, and the like from game 604.

As can be seen, in operation, one or more outlets 136, one or more ports 140, or both may be located within a cradle 112. In one or more embodiments, one or more outlets 136 engage a top surface of a bottom of a cradle 112 for instance. In this manner, water flow does not need to flow through a cradle 112 whatsoever. This creates water flows that originate within the cradle 112 that agitate the game 604 directly and are not blocked, deflected, or otherwise hindered by intervening structures.

Referring to FIG. 7, when a receptacle 116 is filled with water 608 agitation washes the game 604 contained therein. The water flow from the agitator 108 also carries waste material 612 such that it is exits the receptacle 116. As shown for instance, the waste material 612 is carried out of the receptacle 116 over a rim 168 of its opening 204 by water 608 overflowing the receptacle. In this manner, the waste material 612 is removed from the game 604 and discarded. The overflow may be directed to a drain or filter in some embodiments.

As can be seen, the size of the agitator 108 permits water to flow into and out of the same opening 204 of a receptacle 116. Namely, a gap is formed between the agitator 108 and rim 168. This allows waste material 612 to be carried through the opening 204 and over the rim 168, while water is being supplied through the same opening via an inlet conduit 124 or intermediate conduit 128 of the agitator 108.

After the game 604 is washed, water flow through the agitator 108 may be discontinued. This may occur by closing a valve 148, by shutting of the water supply, or both. Typically, a valve 148 will be closed first to shut off water flow at the agitator 108. The game 604 may be inspected to confirm adequate washing has occurred. If not, the valve 148 may be reopened to continue agitation and washing.

Once game 604 is washed as desired, the agitator 108 may be removed from the cradle 112. Also, the cradle 112 may be removed from the receptacle 116, such as by lifting the cradle out of the receptacle. The porous body of the cradle 116 carries the game 604 out of the receptacle 116 while draining water 608 out of the cradle. The game 604 can then be stored, processed further, cooked or the like.

It is noted that the water 608 need not be drained for removal of the game 604. In addition, the existing water 608 in a receptacle 116 can be used for subsequent game washing without the need to refill the receptacle with water. The agitator 108 may then be reintroduced such that it engages the cradle 112 again. In addition, an agitator 108 may be used at a different cradle 112 while remaining connected to a water supply. As can be seen, a water supply itself need not be disconnected or shut off between game washings due to the flow control provided by the valve 148 of the agitator 108.

FIG. 8 illustrates a perspective view of an outlet 136. As can be seen, an outlet 136 may connect to the agitator, such as a hub or other connector thereof, at one or more inlets 804. An inlet 804 may be attached to a hub or other connector via a friction fit, compression fit, threaded connection, or the like. Water is received at an outlet 136 via an inlet and exits via one or more ports 140. An outlet 136 may otherwise be enclosed so as to prevent other water flows from exiting the outlet. In the embodiment of FIG. 8, a cover or cap 816 is provided to accomplish the same.

It is contemplated that a cap 816 may be removed to allow one or more additional outlets 136 to be connected in series, as desired. An agitator 108 may span cradles 112 of various sizes in this manner.

One or more ports 140 of an outlet 136 may be formed to produce a particular water flow. As can be seen in the embodiment of FIG. 8, an outlet 136 may have an opening 812, one or more guides 808, or both to produce a particular water flow. A guide 808 may be a blade or other projection that deflects or otherwise guides water flow in a particular manner. In the embodiment of FIG. 8, the outlets 136 each generate a columnar water flow directed at an upward angle. It is contemplated that a variety of outlets 136 with distinct ports 140 may be attached to an agitator 108. For example, though the opening 812 is illustrate as an lens shape, it is contemplated that various other ovoid, slotted, or other shapes may be used.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A game washer for washing game in one or more receptacles, the one or more receptacles comprising an open top and an enclosed bottom, the game washer comprising:
    an agitator comprising one or more conduits and one or more outlets in fluid communication therewith, wherein the one or more conduits extend into the open top from outside the one or more receptacles and are substantially narrower than the open top to form at least one gap between the one or more conduits and the one or more receptacles at the open top; and
    a cradle that receives the agitator, the cradle comprising a porous body having a bottom, wherein the one or more outlets engage the bottom when the agitator is received by the cradle;
    wherein the cradle is at the enclosed bottom when washing game.

2. The game washer of claim 1, wherein the cradle comprises one or more recesses that receive the one or more outlets when the agitator is received by the cradle.

3. The game washer of claim 1, wherein at least one of the one or more conduits comprises an extendable extension tube.

4. The game washer of claim 1, further comprising an inlet conduit in fluid communication with the one or more conduits at a position opposite the cradle, the inlet conduit angled such that it extends substantially horizontally outside the one or more receptacles at the open top.

5. The game washer of claim 4, further comprising one or more mounts at the inlet conduit, wherein the one or more mounts secure to a rim of the one or more receptacles at the open top.

6. The game washer of claim 1, wherein the one or more outlets are within the cradle when the agitator is received by the cradle.

7. The game washer of claim 1, further comprising a valve at the one or more conduits.

8. A game washer for washing game in one or more receptacles, the one or more receptacles comprising an opening, the game washer comprising:
    an agitator comprising one or more conduits and one or more outlets in fluid communication therewith, wherein the one or more conduits extend from the one or more outlets and out of the opening of the one or more receptacles and are substantially narrower than the opening to form at least one gap between the one or more conduits and the one or more receptacles at the opening; and
    a porous cradle that receives the agitator, the porous cradle comprising a bottom, wherein the one or more outlets engage the bottom when the agitator is received by the porous cradle;
    wherein the porous cradle is at the enclosed bottom when washing game.

9. The game washer of claim 8, wherein the porous cradle comprises one or more recesses that receive the one or more outlets when the agitator is received by the porous cradle.

10. The game washer of claim 8, further comprising an inlet conduit in fluid communication with the one or more conduits at a position opposite the porous cradle, the inlet conduit angled such that it extends substantially horizontally outside the one or more receptacles at the opening.

11. The game washer of claim 10, further comprising one or more mounts at the inlet conduit, wherein the one or more mounts secure to a rim of the one or more receptacles at the opening.

12. The game washer of claim 8, wherein the one or more outlets are within the porous cradle when the agitator is received by the porous cradle.

13. The game washer of claim 8 further comprising a valve at the one or more conduits.

14. A method for washing game in one or more receptacles with a game washer, the one or more receptacles comprising an open top and an enclosed bottom, the method comprising:

placing a porous cradle at the enclosed bottom of the one or more receptacles;

engaging a bottom of the porous cradle with one or more outlets of an agitator, the agitator comprising one or more conduits and one or more outlets in fluid communication therewith, wherein the one or more conduits extend from the one or more outlets and out of the open top of the one or more receptacles and are substantially narrower than the open top to form at least one gap between the one or more conduits and the one or more receptacles at the open top; and placing the game upon the porous cradle;

providing one or more fluid flows to the agitator, wherein the one or more fluid flows exit the one or more outlets and agitate the game at the porous cradle removing waste material therefrom, the waste material carried out of the one or more receptacles through the at least one gap by the one or more fluid flows.

15. The method of claim 14, wherein the porous cradle comprises one or more recesses that receive the one or more outlets when the agitator is received by the porous cradle.

16. The method of claim 14, wherein at least one of the one or more conduits comprises an extendable extension tube.

17. The method of claim 14, wherein the game washer comprises an inlet conduit that is angled such that it extends substantially horizontally outside the one or more receptacles at the open top, the inlet conduit in fluid communication with the one or more conduits at a position opposite the porous cradle.

18. The method of claim 17, further comprising one or more mounts at the inlet conduit, wherein the one or more mounts secure to a rim of the one or more receptacles at the open top.

19. The method of claim 14, wherein the one or more outlets are within the porous cradle when the one or more outlets engage the porous cradle.

* * * * *